INVENTORS
William G. Hoag, &
BY Robert C. Liem
W. S. Pettigrew
ATTORNEY

July 7, 1959 W. G. HOAG ET AL 2,893,781
WINDOW GUIDE MECHANISM
Filed March 8, 1957 2 Sheets-Sheet 2
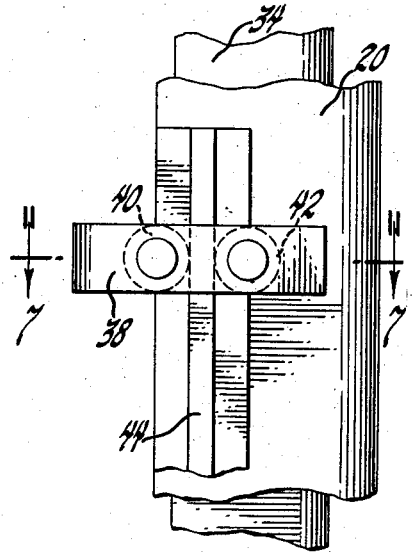
Fig.6
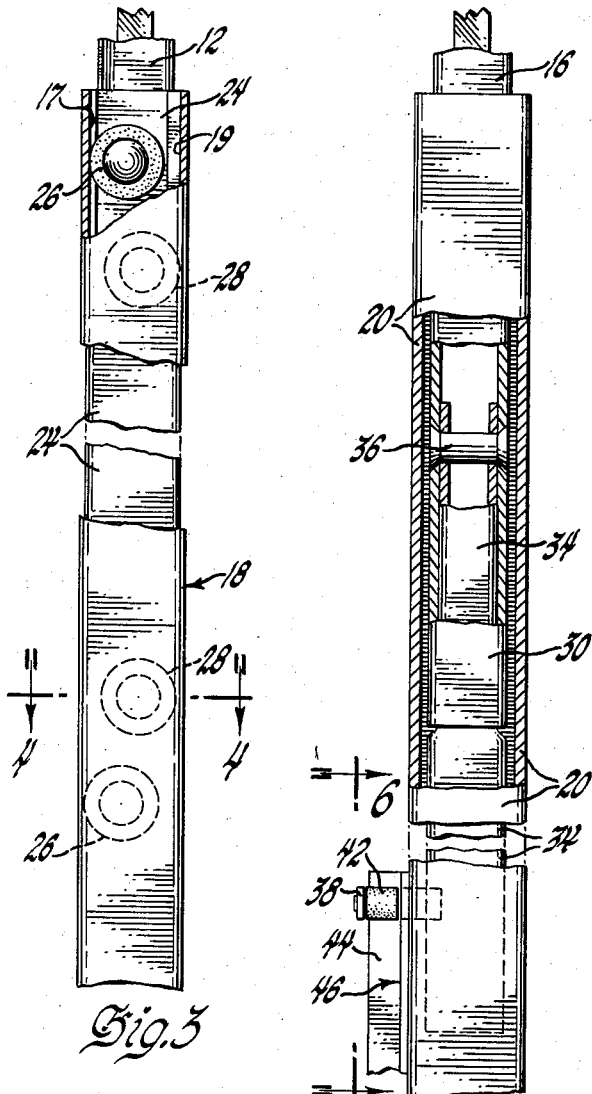
Fig.3
Fig.5
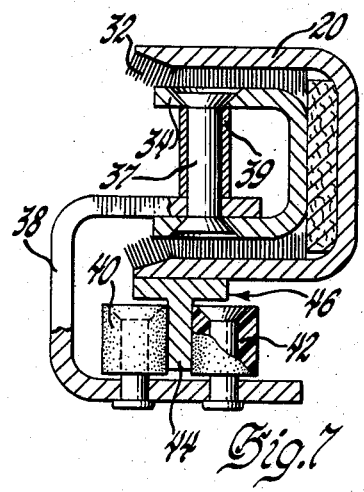
Fig.7
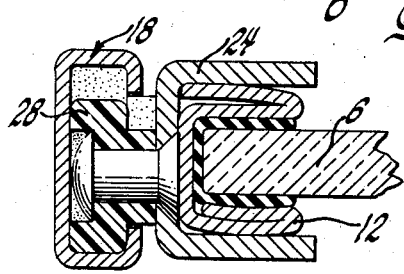
Fig.4
INVENTORS
William G. Hoag, &.
BY Robert C. Liem
ATTORNEY United States Patent Office 2,893,781
Patented July 7, 1959

2,893,781
WINDOW GUIDE MECHANISM

William G. Hoag, Grosse Pointe, and Robert C. Liem, Livonia, Mich., assignors to General Motors Corporation, Detroit, Mich., a corporation of Delaware Application March 8, 1957, Serial No. 644,943

4 Claims. (Cl. 296—44.5)

This invention relates to vehicle door window construction and more particularly to window guide structure.

According to the general features of the invention, a vehicle door is provided with a vertically adjustable main window panel and a CV or wing window which is disposed forwardly adjacent the main window and mounted for pivotal movement about a substantially vertical axis.

In accordance with one feature of the invention, the main window has a frame which extends around the top edge and both side edges thereof, the forward section of the frame serving as a divsion channel between the main window and the wing window when the former is in the raised position.

According to another feature of the invention, the rearward upper extremity of the door frame surrounding the wing window is attached to the latter so that upon swinging movement thereof the degree of rearward projection of the door frame is substantially reduced.

An object of the invention is to provide an improved and simplified door window construction.

Another object is to provide an improved window guide mechanism.

A further object is to provide a window guide mechanism including structure adapted to increase lateral stability of the window when the latter is in the raised position.

A still further object is to provide a vehicle door and window construction in which the window guide mechanism is located entirely below the elevated position of the window.

Yet a further object is to provide a structure of the stated character including a depending extension member hinged to the window structure on an axis transverse to the plane thereof which is adapted to improve lateral stability of the window in the raised position and to fold to a generally horizontal position as the window is lowered to its recessed position.

These and other objects, advantages and features of the invention will become more fully apparent as reference is had to the accompanying specification and drawings wherein:

Fig. 3 is an enlarged fragmentary view, partly in section and with parts broken away, looking in the direction of arrows 3—3 of Fig. 1;

Fig. 4 is an enlarged sectional view looking in the direction of arrows 4—4 of Fig. 3;

Fig. 5 is an enlarged fragmentary view, partly in section and with parts broken away, looking in the direction of arrows 5—5 of Fig. 1;

Fig. 6 is an enlarged fragmentary view looking in the direction of arrows 6—6 of Fig. 5; and Fig. 7 is an enlarged fragmentary sectional view looking in the direction of arrows 7—7 of Fig. 6.

Figure 1:
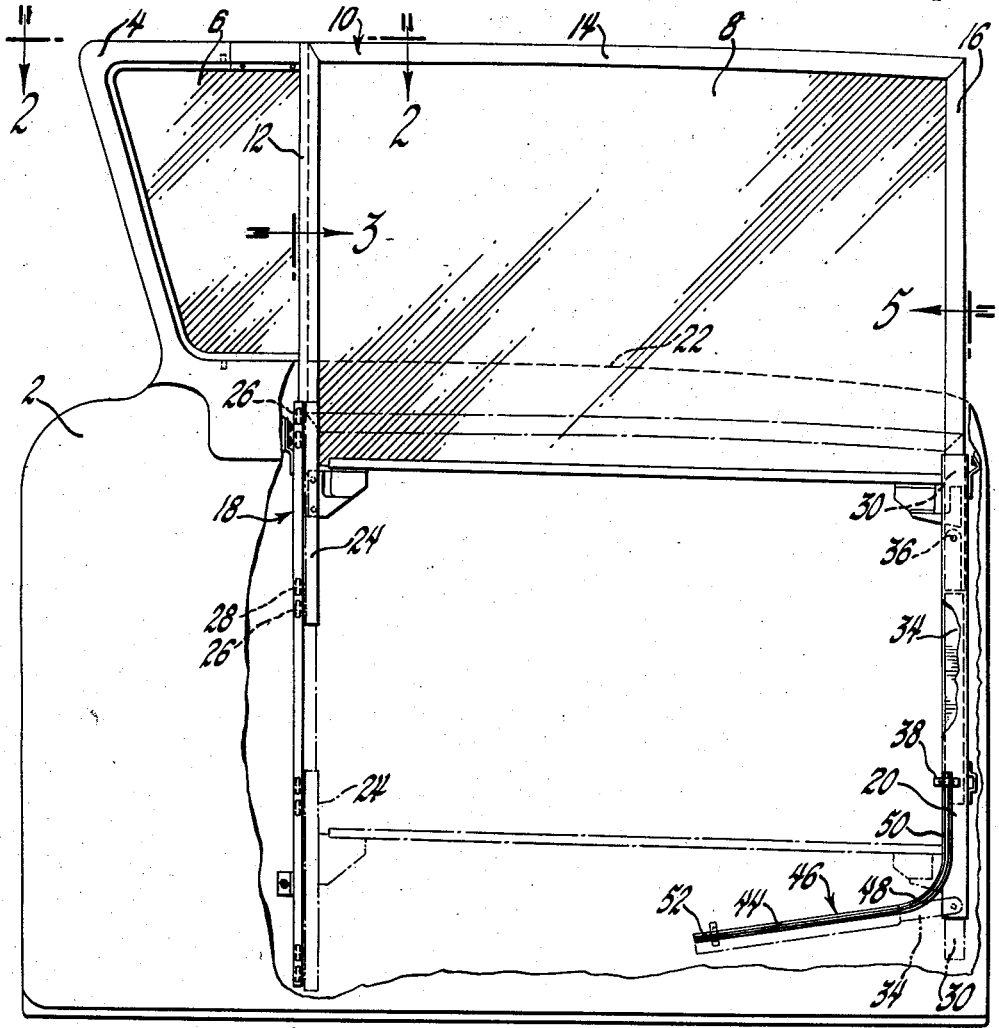
Fig. 1 is a side elevational view of a door and window assembly embodying the invention, certain parts being broken away to more clearly reveal the structure and relationship of the parts.
Figure 2:
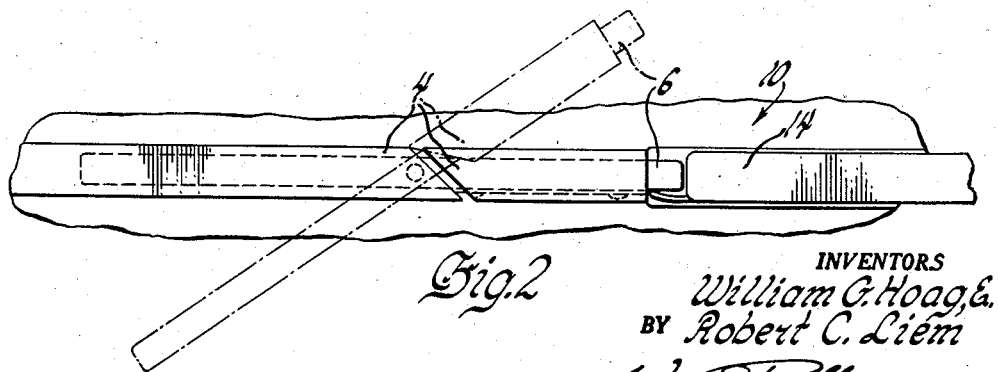
Fig. 2 is an enlarged fragmentary plan view looking in the direction of arrows 2—2 of Fig. 1.

Referring now to the drawings and particularly Fig. 1, there is illustrated a door and window construction in which the reference numeral 2 designates generally the sheet metal portion of a vehicle front door. Door 2 is of the general type employed in "Hardtop" or convertibles, in which the usual upper door window frame portion is eliminated. Attached to the upper surface of door 2 near the forward edge thereof is a CV or wing window frame 4. Pivotally mounted in frame 4 on a generally vertical axis is a CV or wing window 6 which is swingable from a plane parallel with the door to provide the degree of ventilation desired. Spaced immediately rearwardly adjacent wing window 6 is a main window 8 which is vertically movable from the raised position shown in solid lines to the recessed position within door 2 shown in dot-dash lines. Secured to and surrounding the top and two side edges of window 8 is a channel shaped metal frame 10 comprising a forward section 12, upper section 14 and rearward section 16.

In order to guide window 8 through its vertical path of movement in accordance with the present invention, door 2 has mounted therein a pair of longitudinally spaced generally vertically extending window guide channels 18 and 20, both of which terminate below the belt line or top wall 22 of door 2. As will be evident from Figs. 4 and 7, channel 18 is generally C-shaped in cross section, while channel 20 is generally U-shaped. At its lower forward edge, window frame section 12 is provided with a depending leg 24 of generally U-shaped cross section, the forward face of which has secured thereto on horizontal longitudinally extending axes a plurality of vertically spaced rollers 26 and 28 which are adapted for slidable movement in forward window guide channel 18. In order to provide a controlled degree of friction, the axis of rollers 26 are spaced slightly inwardly from the axis of rollers 28 (Fig. 3) so as to provide moderate pressure engagement with the respective side walls 17 and 19 of guide channel 18. To eliminate frictional drag of frame section 12 on the rear edge of CV window 4, both are preferably inclined slightly rearwardly so that the respective edges separate longitudinally slightly as window 8 is lowered.

The lower end of window frame section 16 extends somewhat below the lower edge of window 8 to provide a U-shaped leg 30 generally similar to leg 24, and is slidably received in the U-shaped rear window guide channel 20. The inner surface of channel 20 is preferably provided with a felt or other suitable liner material 32 to eliminate metal-to-metal contact.

Inasmuch as both guide channels 18 and 20 terminate below the belt line 22, it will be evident that lateral stability of the window would be considerably decreased when the latter is in the raised position in the absence of additional supporting structure above the belt line 22. However, to overcome the necessity for additional supporting structure in accordance with the present invention, the leg 30 of frame section 16 has attached thereto a depending extension arm 34, the upper end of which is pivoted to leg 30 by rivet 36 on an axis transverse to the plane of window 8. At its lower end, extension arm 34 has connected thereto, by means of a rivet 37 and sleeve 39, a generally U-shaped offset pivoted bracket 38 on which are mounted a pair of spaced apart parallel rollers 40 and 42. Rollers 40 and 42 are adapted to straddle the guiding edge 44 of a T-shaped track member 46. As seen best in Fig. 1, track member 46 has a curved intermediate portion 48, and has a vertically extending end portion 50 attached to the side wall of guide channel 20 and lower generally horizontally extending end portion 52 rigidly attached to door 2. In operation, when window 8 is in the full elevated position extension arm 34 is fully recessed in the cooperating guide channel 20. Due to the overlap of leg 30 and arm 34, arm 34 functions as a laterally rigid extension of window frame section 16 thereby considerably improving the lateral rigidity of the entire window in the raised position. However, as window 8 is progressively lowered, the lower end of extension arm 34 is constrained to swing forwardly about the axis 36 as the rollers 40 and 42 follow T-shaped track member 46. Accordingly, extension arm 34 progressively folds to a horizontal position as the window is lowered and, therefore, in no way interferes with the retraction of window 8 to a full recessed position in door 2.

While but one embodiment of the invention has been shown and described, it will be apparent that other changes and modifications may be made therein. It is, therefore, to be understood that it is not intended to limit the invention to the embodiment shown, but only by the scope of the claims which follow.

We claim:
1. In combination, a vehicle door of the type terminating vertically at the belt line of the vehicle, a wing window assembly mounted on said door at the forward top edge thereof, a first vertical guide member of C-shaped cross section mounted in said door in alignment with the rear edge of said wing window, a second vertical guide member of U-shaped cross section mounted in said door in longitudinally spaced relation from said first member, a main window disposed in said door and movable from a recessed position therein to an elevated position above said belt line, a frame for said window comprising a forward, rearward and top portion, a depending leg rigidly secured to said forward portion, a plurality of transversely spaced rollers secured to the forward edge of said depending leg and slidably engaging said first guide member, a strut pivotally connected to the lower end of said rearward portion for swinging movement about an axis transverse to the plane of said window, a forwardly directed curved track extending between said second guide and the base of said door, and a pair of rollers attached to the lower end of said struct and engaging said track to guide said strut from a generally horizontally forwardly directed position when said window is in recessed position to a generally vertical position within said U-shaped guide when said window is in elevated position.

2. The structure set forth in claim 1 wherein said transversely spaced rollers are rotatably mounted on longitudinally extending pivot axes.

3. The structure set forth in claim 1 wherein said wing window assembly comprises a frame attached to said door, said frame having an upper horizontally rearwardly extending portion, a wing window mounted in said frame for swinging movement about a substantially vertical axis, the upper rearwardly extending portion of said frame terminating forwardly of the rear edge of said wing window, and a frame extension member attached to said window, said extension member being aligned with the upper horizontal portion of said frame when said window is in closed position.

4. The structure defined in claim 3 wherein the cross sectional configuration of said frame extension member conforms substantially with the cross sectional configuration of the upper horizontal portion of said frame.

References Cited in the file of this patent

UNITED STATES PATENTS

| | | |
|---|---|---|
| 2,253,805 | Olivier | Aug. 26, 1941 |
| 2,763,508 | Gelfand et al. | Sept. 18, 1956 |
| 2,809,827 | Bogden | Oct. 15, 1957 |

FOREIGN PATENTS

| | | |
|---|---|---|
| 623,727 | Germany | Jan. 2, 1936 |